Patented June 13, 1950

2,511,544

UNITED STATES PATENT OFFICE 2,511,544

DIOL-DIISOCYANATE HIGH MOLECULAR POLYMERIZATION PRODUCTS

Heinrich Rinke, Leverkusen-Kuppersteg, Heinz Schild, Frankfurt-on-the-Main-Hochst, and Werner Siefken, Leverkusen-Schlebusch, Germany; vested in the Attorney General of the United States No Drawing. Application November 8, 1938, Serial No. 239,456. In Germany November 12, 1937

6 Claims. (Cl. 260—77.5)

The present invention relates to a process of preparing high molecular polymerization products and to the products which are obtainable thereby.

In accordance with our present invention organic diisocyanates are caused to react with such organic compounds as contain at least 2 substituents which are capable of reacting with the group —N.C.O. Such groups are, for instance, hydroxy and amino groups which still contain an exchangeable hydrogen atom. The diisocyanates as well as the other reaction components may be of the aliphatic, aromatic or heterocyclic series. It is to be understood that both types of reagents may contain various hetero atoms such as O, S or N; furthermore, the compounds which are caused to react with the diisocyanates may contain different reactive groups, for instance one or several hydroxy groups besides one or several primary or secondary amino groups. Examples for suitable diisocyanates are:

m- and p-phenylene diisocyanate,
p.p' - Diphenyl diisocyanate and substitution products thereof such as diphenyl-3.3'-dimethyl (or -dimethoxy)-4.4'-diisocyanate,
1:5-naphthylene diisocyanate,
Diphenylmethane-4.4'-diisocyanate,
Tetra-, penta- hexa-, hepta- and octamethylene-$\omega.\omega'$-diisocyanate.

As examples for the other reaction compounds there may be mentioned:

Ethylene glycol,
Triethylene glycol,
Propylene glycols such as the 1.3 compound,
Butylene glycols such as the 1.4 compound, and higher glycols wherein the hydroxy groups are separated by more than 4 carbon atoms, say 6–10;
Ethylene diamine,
Symmetric di-N-ethyl-ethylene diamine,
$\omega.\omega'$-Tetramethylene diamine and its substitution products such as those containing an alkyl group in $\beta$-position,
$\omega.\omega'$-Hexamethylene diamine,
$\omega.\omega'$-Octamethylene diamine,
m- or p-Phenylene diamine,
Ethanolamine,
n-Butyldiethanolamine,
$\omega.\omega'$-Hydroxyaminohexane.

The reaction is preferably performed in an indifferent solvent such as dioxane, chlorobenzene, toluene, higher boiling paraffines and the like while heating to boiling for several hours. In most cases the resulting polymerization products precipitate on cooling; in other cases they may be separated out by adding the solution into a non-solvent, for instance, aliphatic hydrocarbons.

Depending on the nature of the starting materials our new reaction products represent more or less high molecular compounds showing various softening points. Such compounds are preferred as have a softening point above about 150° and among those the products which are composed in the first line of higher aliphatic diisocyanates (i. e. those having the isocyanate groups separated by a chain of at least 3 links (carbon atoms plus hetero atoms) and of aliphatic alcohols as these products are best suitable for being drawn into continuous filaments, sheets, films and the like. The aliphatic diisocyanates and/or hydroxy or amino compounds can be partly replaced by minor proportions of aromatic compounds in order to effect a raise of the softening point of the final products.

We are aware of the fact that products of a similar type have been prepared by causing higher monoaminomonocarboxylic acids to undergo self-condensation or by causing dicarboxylic acids or the functional derivatives thereof to react with polyhydroxy compounds or polyamines. All such prior known reactions are accompanied by the splitting off of molecules of water, alcohol and the like depending on whether use is made of the free acid, the ester or chloride thereof. These by-products will have to be removed in the course of the reaction. Contrary thereto, the diisocyanates react with the hydroxy and amino groups with the formation of urethanes or urea derivatives, no such by-products being evolved.

The following examples illustrate the present invention without however, restricting it thereto, the parts being by weight:

Example 1

44 parts of m-phenylene diisocyanate are dissolved in 100 parts of xylene and added at about 30° to a solution of 16 parts of ethylene glycol in 50 parts of dioxane, a raise of temperature to about 50° being effected thereby. Then, the reaction is completed by heating the whole to 95–100° for some time, whereupon the solvent mixture is removed in vacuo. When stirring the remaining polymerization product with methanol a white crumbly mass is obtained which is soluble in pyridine.

Example 2

Into 100 parts of ethylene glycol there is introduced while stirring a solution of 40 parts of m-phenylene diisocyanate in 50 parts of acetone, a raise of temperature to about 70° being effected thereby; the polymerization product which remains dissolved is separated on cooling as a white precipitate. After an about 6 hours' stirring 400 parts of water are added, whereupon the precipitate is separated by sucking off, rinsed with water and then dried. The polymerization product thus obtained shows similar properties as the product of Example 1.

Example 3

Into a solution of 40 parts of p-phenylene diisocyanate there is added drop by drop while slowly stirring a solution of 30 parts of β-methyl-tetramethylene diamine in acetone. With each drop a reaction occurs with separation of a white precipitate, the acetone beginning to boil owing to the heat of reaction evolved. After a 3 hours' stirring at 60° the area derivative thus formed is separated by sucking off, 62 parts of a whitish powder being thus obtained which is nearly insoluble in the usual organic solvents.

Instead of β-methyltetramethylene diamine there can also be employed ethylene diamine.

Example 4

Into a solution of 40 parts of m-phenylene diisocyanate in 150 parts of dioxane there are introduced 40 parts of anhydrous triethylene glycol of the formula:

$HO.CH_2.CH_2O.CH_2.CH_2O.CH_2CH_2.OH$

After a several hours' stirring at 100° the condensation product is still soluble in the solvent. On distilling off the latter in vacuo an amber-colored resin is obtained which is soluble in dioxane as well as in pyridine and glycolmonomethylether.

Example 5

44 parts of n-butyldiethanolamine are added into a solution of 44 parts of 1.4-phenylene diisocyanate in 150 parts of dioxane care being taken that the temperature does not surpass 85°. After stirring the clear solution for about 4 hours the solvent is evaporated, a clear resin being thus obtained which is soluble in chloroform, quinoline, acetic acid and butanol.

Example 6

To a solution of 44 parts of p-phenylene diisocyanate in 150 parts of dioxane there is added drop by drop while slowly stirring a solution of 16 parts of ethanolamine in dioxane. The reaction product precipitates, heat being evolved during the reaction. On stirring with water the precipitate is sucked off, rinsed and dried, 59 parts of a weakly colored polymerization product being thus formed.

Example 7

When gradually heating 15 parts of octamethylene diisocyanate in 50 parts of chlorobenzene with 6.9 parts of 1.4-butandiol there is observed after a short time a rather vivid exothermic reaction, the reaction product being completely dissolved. On heating for half an hour while refluxing, the solution becomes more and more viscous, until after about 1½ hours a substance coagulates which is insoluble even in higher amounts of chlorobenzene. After the removal of the chlorobenzene this coagulate can be easily dissolved in acetic acid, strongly viscous solutions being thus obtained which on spraying or pouring into water yield threads or films. Also the chlorobenzene solution yields rather strong threads when pouring into alcohol.

At about 160° the substance begins to soften; it capable of being spun in the heat.

Example 8

When heating to boiling 15 parts of octamethylene-diisocyanate and 7 parts of 1.4-butandiol in 50 parts of dioxane for 1 hour while refluxing there is obtained after cooling and sucking off a soft powdery mass of the melting point 152–154° which represents a relatively low molecular condensation product.

Example 9

When adding drop by drop while cooling and stirring 13.2 parts of octamethylene diisocyanate into a solution of 7 parts of β-methyl-tetramethylene diamine in 180 parts of dioxane and heating after one hour to 90–100°, there is obtained after cooling and sucking off a white crumbly substance of melting point 208–210° which represents a relatively low molecular polymerization product.

Example 10

When heating while refluxing 19.8 parts of octamethylene diisocyanate in 50 parts of dioxane and 9.2 parts of 1.3-butandiol, there is obtained after some time a horn-like mass of the melting point 77–82°.

Example 11

To 7 parts of tetramethylene diisocyanate in 30 parts of chlorobenzene there are added while cooling 7.2 parts of octamethylene diamine, whereupon the reaction is completed by boiling for one hour while refluxing. The mass precipitating therefrom is separated from the chlorobenzene by sucking off, its melting point being 212–220°. When melting the product thus obtained for 2 hours at 240° in a vacuo of 1–2 mm., there is obtained after distilling off the volatile ingredients a honey-yellow product which is capable of being easily spun to threads.

Example 12

20 parts of octamethylene diisocyanate and 125 parts of 1.6-hexandiol are heated with the addition of 100 parts of chlorobenzene. As soon as the exothermic reaction has ceased the mixture is heated for further 4 hours while refluxing. The viscous solution is then poured while stirring into benzine, thread-like masses being thus obtained of softening point 151–153°.

Example 13

15.7 parts of octamethylene diisocyanate are heated with 14 parts of decamethylene glycol in 50 parts of anhydrous chlorobenzene, until the solution has become very viscous. On pouring into benzine thread-like masses are obtained of softening point 135–138° which are capable of being spun in the molten state.

Example 14

19.6 parts of octamethylene diisocyanate in 100 parts of chlorobenzene are heated with 19.8 parts of hydroquinonediglycol ether. The polymerization product immediately separates and is sucked off. The white mass thus obtained melts at 208–212°.

Example 15

27.5 parts of octamethylene diisocyanate in 100 parts of chlorobenzene are heated with the addition of 16.3 parts of quinite. After the reaction has ceased heating is continued for 2½ hours. The compound separating is extracted by means of benzine. It has the melting point 218–221°.

Example 16

23.6 parts of octamethylene diisocyanate are heated in 100 parts of chlorobenzene with 17.3 parts of transhexahydroxylylene glycol. The strongly viscous solution is then poured into benzine, a white solid mass separating thereby which gradually softens at 160° and which is capable of being spun into threads.

Example 17

14 parts of tetramethylene diisocyanate in 100 parts of chlorobenzene are heated for 1½ hours with 12.4 parts of 1.6-hexandiol. The solution is then poured into benzine and the precipitated product is sucked off. The yellowish-white compound thus obtained is heated to 240° for 1½ hours in a vacuo of 1–2 mm., a brownish substance of melting point 177–182° being thus obtained which in the molten state is capable of being spun into threads.

Example 18

14 parts of tetramethylene diisocyanate in 100 parts of chlorobenzene are heated with 18.2 parts of decamethylene glycol. After some time the suspension is poured into benzine and the precipitated polymerization product of melting point 171–173° is sucked off.

Example 19

16.8 parts of hexamethylene diisocyanate in 100 parts of chlorobenzene are heated to boiling for three hours with 9.4 parts of 1.4-butylene glycol. After cooling the condensation product is sucked off and dried, its melting point being 175–178°. When heating the mass for some time in vacuo to the melting point, it can be spun in the molten state.

Example 20

15.4 parts of pentamethylene diisocyanate are heated to boiling with 9.6 parts of 1.4-butylene glycol in 100 parts of chlorobenzene and the whole is kept at this temperature for 1½ hours, whereupon the polymerization product separates in form of a white powder. After a 2½ hours' heating in vacuo (0.1 mm.) to 200° a transparent resin of melting point 155–159° is obtained which is capable of being spun in the molten state.

Example 21

18.2 parts of heptamethylene diisocyanate are heated with 9 parts of 1.4-butylene glycol in 100 parts of toluene for 2 hours while refluxing, whereupon the polymerization product separates in a solid state. After a 2 hours' heating in vacuo to 180–200° a transparent resin of melting point 155–157° is obtained which is capable of being spun in the molten state.

Example 22

16.7 parts of octamethylene diisocyanate in 150 parts of toluene are heated to boiling for 4 hours while refluxing with 9.3 parts of 1.4-butylene glycol and 1.35 parts of p.p'-diphenyl diisocyanate. The polymerization product separating therefrom is sucked off; it begins to melt at 240°.

Example 23

13.1 parts of octamethylene diisocyanate, 5.7 parts of 1.4-butylene glycol, 0.62 parts of p.p'-dioxydiphenyl are heated for a short time to 250–270° while stirring with the addition of 50 parts of paraffin oil; the polymerization product separating in form of a soft mass melts at 240° and is capable of being spun in the molten state.

The novel reaction products of the present claimed invention that are obtained by the reaction between a diisocyanate and a dihydroxy compound are linear polymers characterized by the presence of a plurality of recurring

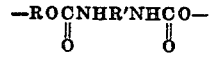

groups wherein R and R' stand respectively for divalent residues of organic diols and organic diisocyanates which, except for their hydroxy and isocyanate radicals, are free of functional groups.

We claim:

1. The process of producing high molecular polymerization products as structurally defined in claim 4 which comprises boiling a solution in an organic solvent of a hydrocarbon diisocyanate with a compound consisting of a hydrocarbon residue to which are attached two hydroxyl groups.

2. A process for making high molecular polymerization products as structurally defined in claim 5 which comprises heating to reaction temperature an organic diisocyanate and an organic diol which, except for their hydroxy and isocyanate radicals, are free of functional groups.

3. A process for making high molecular polymerization products as structurally defined in claim 6 which comprises heating to reaction temperature an aliphatic hydrocarbon diisocyanate and a dihydroxy-substituted aliphatic hydrocarbon.

4. A linear polymer comprising essentially structural units of the formula

in which R and R' are divalent hydrocarbon radicals.

5. A linear polymer comprising essentially structural units of the formula

in which R and R' are respectively divalent residues of organic diols and organic diisocyanates which, except for their hydroxy and isocyanate radicals, are free of functional groups.

6. High molecular products containing a plurality of recurring

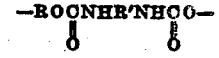

groups wherein R and R' stand for divalent aliphatic hydrocarbon radicals.

HEINRICH RINKE.
HEINZ SCHILD.
WERNER SIEFKEN.

REFERENCES CITED

The following references are of record in the file of this patent:

UNITED STATES PATENTS

| Number | Name | Date |
|---|---|---|
| 1,882,808 | Graves | Oct. 18, 1932 |
| 2,122,781 | Salzberg | July 5, 1938 |
| 2,145,242 | Arnold | Jan. 31, 1939 |
| 2,181,663 | Martin | Nov. 28, 1939 |
| 2,216,736 | Carothers | Oct. 8, 1940 |
| 2,284,637 | Catlin | June 2, 1942 |

OTHER REFERENCES

"Chemical Abstracts," vol. 24, page 3216.